UNITED STATES PATENT OFFICE.

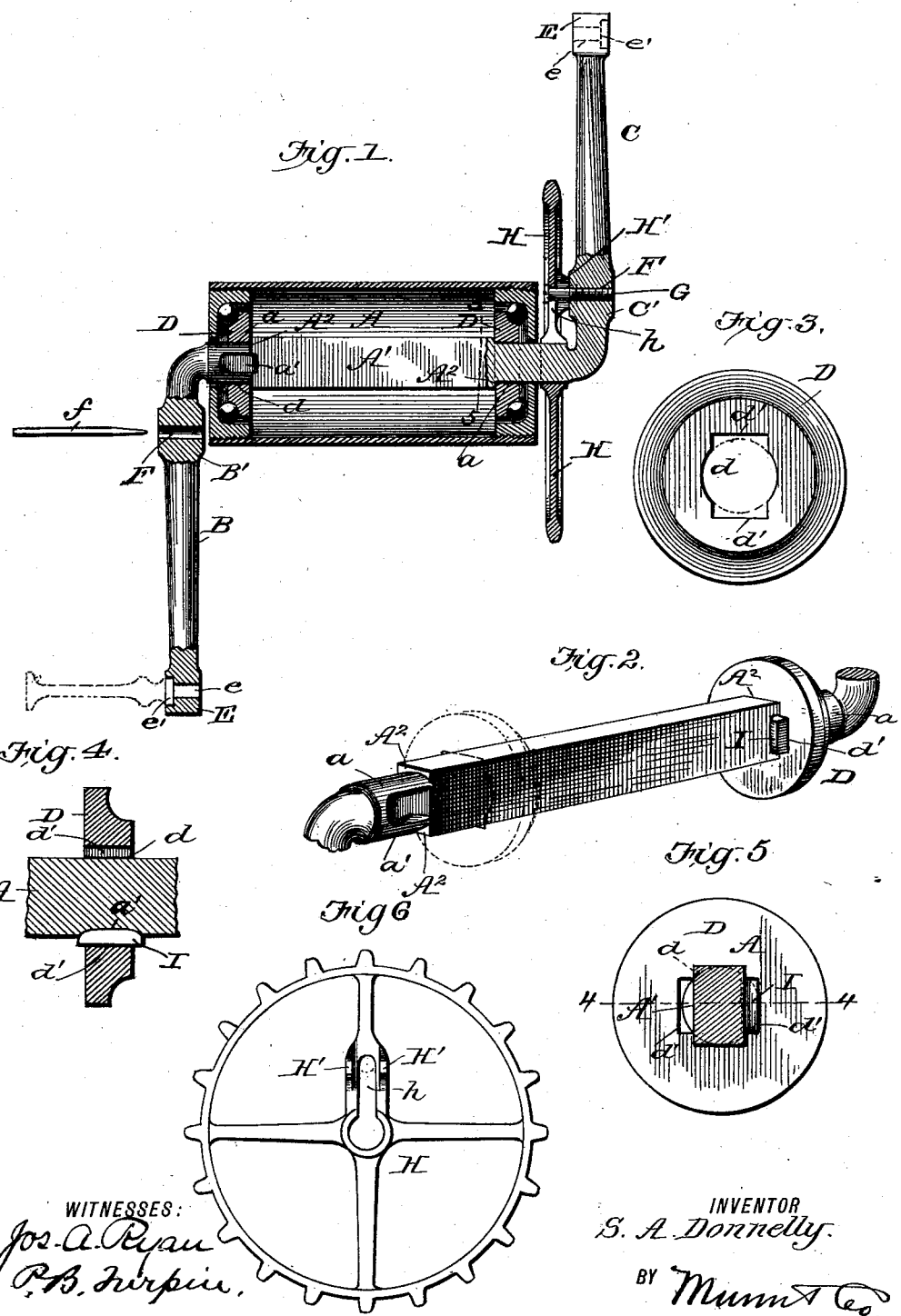

SAMUEL A. DONNELLY, OF CHICAGO, ILLINOIS.

BICYCLE CRANK-SHAFT.

SPECIFICATION forming part of Letters Patent No. 608,445, dated August 2, 1898.

Application filed March 18, 1897. Serial No. 628,150. (No model.)

*To all whom it may concern:*

Be it known that I, SAMUEL A. DONNELLY, of Chicago, in the county of Cook and State of Illinois, have invented a new and useful Improvement in Bicycle Crank-Shafts, of which the following is a specification.

My invention is an improvement in bicycles, and particularly in the crank-axle and coöperating parts; and the invention consists in certain novel constructions, combinations, and arrangements of parts, as will be hereinafter described, and pointed out in the claims.

In the drawings, Figure 1 is a side view of the axle with the fixed cones and sprocket in place, parts being shown in section. Fig. 2 is a detail view of the intermediate part of the axle. Fig. 3 is a detail view of one of the cones. Fig. 4 is a detail section on about line 4 4 of Fig. 5. Fig. 5 is a section on about line 5 5 of Fig. 1, and Fig. 6 is a detail view of the sprocket.

The drive-shaft A has integral with it the cranks B and C and has near the ends of the shaft the seats $a$ for the fixed cones D. The portion A' of the shaft between these fixed cones is made of a width or thickness greater than that of the seats. This may be carried out by making such portion A' round in cross-section and of greater diameter, or it may be secured, as preferred, by flattening said portion to secure a major diameter in excess of that of the seats. This is advantageous for several reasons, it serving to provide ample strength to resist the torsional strain and also forming shoulders against which the fixed cones may firmly abut.

Near their outer ends the cranks are provided with thickened or enlarged portions E, bored at $e$ and counterbored at $e'$ for the stem and shoulder of the pedal-axle, forming a firm steady support for such axles, to which they may be readily adjusted. It should be understood that the purpose of the enlarged flattened ends of the cranks is to reinforce such ends, so they will not spread or split in time from the strains that occur on pedal-studs. It is not unusual for one-piece cranks to have their ends split open or spread or enlarged because such ends were made too small to permit the passage over them of an ordinary cone with a round hole. By my invention the crank ends may be enlarged to the size of the widened crank-axle section, because the cone having the recesses to pass over the widened section on the crank-axle can also pass over the enlarged ends of the crank. By the described coöperating construction of the recessed cone and the enlarged crank ends I am able to secure a strong and durable construction of crank ends and yet readily adjust the cones upon the same. Near their inner ends these cranks are provided with thickened portions B' C', both of which are perforated at F for the passage of the pins $f$, by which the ball-cups may be easily adjusted. The crank C has its thickened portion C' provided with a threaded opening, which receives the sprocket-fastening screw G, passed through an opening $h$ in the sprocket H and thence into the crank-arm C. This sprocket H is provided on one of its spokes with lips or lugs H', which overlap the thickened portion C' of the crank C and steady the sprocket in the position in which it is secured by the screw G, the opening $h$ for which passes through the sprocket between these lips or lugs H', as shown.

It will be seen that the crank-shaft is simply a rod turned up first and then bent afterward into shape.

By preference the portion A' of the shaft is flattened, and the fixed cones D have their openings $d$ provided with wings $d'$, which form key-seats and also so extend the opening $d$ that it may readily pass over the flattened or non-circular portion A' of the axle or shaft. The seats $a$ have key-seats $a'$ in line with the flat sides of the portion A', and the keys I, with their rounded ends, fit in such seats $a'$ and the wings $d'$ and lock the cones from turning on the shaft, such cones being held from inward movement by the shoulders A² and from outward movement by the balls held in engagement with the fixed cones, as shown in Fig. 1. This double keyway in the fixed cones permits them to be applied without taking off the sprocket, as they will pass freely over the large central portion A' of the axle and can be given a quarter-turn on their seats to bring their keyways into alinement with those of the seats $a$, as will be understood from Figs. 1, 2, and 5. This form of cone-opening will also permit the passage of such cones over wide flattened ends of the cranks, if such form of ends should be desired.

The slot in the sprocket forms a passage for the fastening-screw and also permits the sprocket to pass easily over the bend of the crank.

Having thus described my invention, what I claim as new, and desire to secure by Letters Patent, is—

1. In a bicycle a drive-shaft having integral with it opposite end cranks and having seats for the cones and a back-stop between said cones of greater width or thickness than said cone-seats and cones with one or more recesses or wings such recesses or wings permitting said cones to pass from their seats over the wide back-stop and all exterior parts substantially as shown and described.

2. In a bicycle the combination of the drive-shaft having the opposite integral end cranks and provided with cone-seats having depressions for the keys and a portion between said seats of greater width or breadth than the said seats, and the cones having openings to fit the seats and provided with wings or recesses whereby to permit the passage of the cone over the wider portion of the shaft, and the keys fitted to the depressions in the cone-seats and the wings or recesses of the cone-openings substantially as shown and described.

3. The combination in a bicycle of the shaft having a cone-seat and adjacent thereto a wider or thicker portion forming a radial projection beyond said cone-seat, the cone having an opening fitted to said seat and recessed whereby it may pass over the wider portion of the shaft when properly registered therewith and the key by which the cone is held on the seat in position out of such register, the cone-seat having, out of register with the said radial projection, a recess for the said key substantially as shown and described.

SAMUEL A. DONNELLY.

Witnesses:
EDWARD DONNELLY,
KORSTRAAN DE ZEEUNE.